(12) United States Patent
Pang et al.

(10) Patent No.: US 11,985,042 B2
(45) Date of Patent: May 14, 2024

(54) METHOD FOR PREDICTING QUALITY OF SERVICE IN SERVICE NETWORK ENVIRONMENT

(71) Applicant: ZHEJIANG UNIVERSITY, Hangzhou (CN)

(72) Inventors: Shengye Pang, Hangzhou (CN); Jianwei Yin, Hangzhou (CN); Bangpeng Zheng, Hangzhou (CN); Jiayin Luo, Hangzhou (CN); Jintao Chen, Hangzhou (CN); Shuiguang Deng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/019,455

(22) PCT Filed: Jun. 8, 2021

(86) PCT No.: PCT/CN2021/098788
§ 371 (c)(1),
(2) Date: Feb. 2, 2023

(87) PCT Pub. No.: WO2022/252251
PCT Pub. Date: Dec. 8, 2022

(65) Prior Publication Data
US 2024/0039797 A1    Feb. 1, 2024

(30) Foreign Application Priority Data
Jun. 4, 2021 (CN) .......................... 20210623482.6

(51) Int. Cl.
H04L 41/147    (2022.01)
H04L 41/14     (2022.01)

(52) U.S. Cl.
CPC .......... H04L 41/147 (2013.01); H04L 41/145 (2013.01)

(58) Field of Classification Search
CPC ........................... H04L 41/147; H04L 41/145
See application file for complete search history.

(56) References Cited

FOREIGN PATENT DOCUMENTS

| CN | 103684850 | 3/2014 |
| CN | 104917647 | 9/2015 |

(Continued)

OTHER PUBLICATIONS

Zhou et al. QoS-Aware Web Service Recommendation using Collaborative Filtering with PGraph. (Year: 2015).*

(Continued)

*Primary Examiner* — Bryan Y Lee
(74) *Attorney, Agent, or Firm* — Jiwen Chen; Joywin IP Law PLLC

(57) ABSTRACT

Disclosed is a service quality prediction method in a service network environment. The method includes the steps of (1) constructing a service uncertainty quality model of a user through service quality log information generated when the user invokes the same or different services multiple times; (2) tapping a set of similar users of a target user based on the service uncertainty quality model of the user; and (3) improving a matrix factorization algorithm based on similarity information of the set of similar users of the target user to achieve accurate prediction of service quality. The service quality prediction method of the present invention can provide a basis for decision-making, perform targeted service optimization based on the service quality information, and provide more accurate service recommendation.

7 Claims, 2 Drawing Sheets

(56) References Cited

FOREIGN PATENT DOCUMENTS

| | | |
|---|---|---|
| CN | 105024886 | 11/2015 |
| CN | 107679415 | 2/2018 |
| CN | 111881345 | 11/2020 |
| EP | 3179434 | 6/2017 |

OTHER PUBLICATIONS

Zhang et al. Covering based Web Service Quality Prediction via Neighborhood aware Matrix Factorization. (Year: 2019).*

* cited by examiner

METHOD FOR PREDICTING QUALITY OF SERVICE IN SERVICE NETWORK ENVIRONMENT

This is a U.S. national stage application of PCT Application No. PCT/CN2021/098788 under 35 U.S.C. 371, filed Jun. 8, 2021 in Chinese, claiming priority of Chinese Application No. 20210623482.6, filed Jun. 4, 2021, all of which are hereby incorporated by reference.

TECHNICAL FIELD

The present invention relates to service computing, and in particular to a service quality prediction method based on collaborative filtering and matrix factorization in a service network environment.

BACKGROUND TECHNOLOGY

With the increasing number of Web services in the Internet, service quality, as an important reference to distinguish services with the same functions, plays an increasingly important role.

Generally speaking, service quality is a general term for non-functional indicators of Web services. In addition to functionality, service quality is an important measure of Web services in terms of service selection, service discovery, service recommendation, etc., especially in the case that functions of each service in a candidate service set are similar. Service quality can be divided into user-related and user-independent. User-related service quality (e.g. price) is usually determined by a service developer, while user-independent service quality (e.g. response time) usually varies significantly with an invoker and an invoking behavior.

Service quality has played a significant part in service selection, service optimization and service recommendation. However, a large amount of service quality information is missing in the log of user invocations of services. Therefore, how to predict the missing service quality information becomes increasingly important.

The Chinese patent document with the publication number of CN104917647A discloses a Web service quality prediction method based on collaborative filtering, wherein the method includes: sending, by a first client, request information of a Web service to a server; obtaining, by the server, Quality of Service (QoS) data of the first client and QoS data of a second client according to the request information, wherein the first client and the second client are similar clients; determining a first similarity between the first client and the second client according to the QoS data of the first client and the QoS data of the second client; obtaining a first prediction value according to the first similarity; determining a second similarity between the first client and the second client according to the QoS data of the first client, the QoS data of the second client and the first similarity; obtaining a second prediction value according to the second similarity; and determining a target prediction value according to the first prediction value and the second prediction value.

The Chinese patent document with the publication number CN111881345A discloses a neural collaborative filtering service quality prediction method based on location context awareness, which combines a user's geographic location context information and geographic location context information of an invoked service to provide more accurate and personalized service recommendation thus effectively reduces a large prediction error caused by the lack of geographic information, and provides an offset correction item and combines an actual situation of the user and service, offers personalized prediction correction, thus effectively reduces the root mean square error of prediction, and improves the robustness of the algorithm.

Conventional service quality prediction methods are mostly based on CF (Collaborative Filtering) model. As the most commonly used method to predict missing values in the recommendation system, there are the following defects: 1) the collaborative filtering method is difficult to solve the "cold start" problem, that is, a service has never been invoked by any user, or a user has never invoked any service. 2) conventional collaborative filtering methods can only reflect subjective preferences of users, while in the process of service invocation, it is objective physical resources and operating environments that determine the final service quality.

Matrix factorization is also a very effective method for predicting service quality. However, most researches focus more on how to improve the accuracy of matrix factorization than on the uncertainty of service quality.

SUMMARY OF INVENTION

The present invention provides a service quality prediction method based on collaborative filtering and matrix factorization in a service network environment, which can better perform service selection, service optimization and service recommendation through accurate service quality prediction.

The technical solution of the present invent is as follows:

A service quality prediction method in a service network environment, comprising the steps of:
 (1) constructing a service uncertainty quality model of a user through service quality log information generated when the user invokes the same or different services for multiple times;
 (2) tapping a set of similar users of a target user based on the service uncertainty quality model of the user; and
 (3) improving a matrix factorization algorithm based on similarity information of the set of similar users of the target user to achieve accurate prediction of service quality.

The purpose of the step (1) building a service uncertainty quality model is to build a user uncertainty quality model based on the service quality log information generated when the user invokes the same or different services for multiple times, and provide a basis for subsequent calculation of similar neighbors of the user.

The step (1) comprises the steps of:
 (1-1) defining the service uncertainty quality model of the user as a quaternion <Auser,Lservices,Smatrices, f>;
  wherein: Auser denotes an active user; Lservices denotes a list of all services invoked by a current active user; Smatrices denotes an uncertainty quality matrix group, wherein each matrix records service quality log information generated from a service in the Lservices invoked by Auser; and f denotes a mapping relation between a service and a corresponding uncertainty quality matrix;
 (1-2) visualizing the service uncertainty quality model of the user as a three-level tree structure, wherein the three-level tree structure comprises:
  a user layer, denoting a current service invoker; and
  a service layer, denoting all services invoked by the current service invoker; and a mapping matrix layer, denoting a service quality matrix generated when the current service invoker invokes a service for multiple times.

In order to integrate external heuristic information of uncertainty into the matrix factorization framework, a similar user set of a target user can be mined, so that more service quality information may be incorporated into the matrix factorization model to achieve more accurate service quality prediction.

The step (2) comprises:
(2-1) calculating an average service quality value for each column in a quality matrix in the service uncertainty quality model, and transforming the quality matrix into a quality vector; and
(2-2) using a PCC algorithm to calculate a similarity between the target user and other users according to the quality vector, and selecting the set of similar users of the target user according to a given similarity threshold.

Preferably, in the step (2-1), the calculation formula of the average service quality value is:

$$\overline{Val(a, s)} = \frac{\sum_{j=1}^{n} V(q_{ji})}{n}$$

wherein: n denotes the number of invoking of a user a to a service s; $V(q_{ji})$ denotes information of $j^{th}$ service quality when the user a invokes the service s for the $i^{th}$ time.

Preferably, in the step (2-2), using a PCC algorithm to calculate a similarity between the target user and other users comprises:
(i) calculating weighting factors for a target user a and other users u;

$$\lambda_a = \frac{N_a(s)}{N_a(s) + N_u(s)},$$

$$\lambda_u = \frac{N_u(s)}{N_a(s) + N_u(s)};$$

wherein: $N_a(S)$ a denotes the number of invoking of the target user a to the service s; and $N_u(S)$ denotes the number of invoking of other users u to the service s; and
(ii) using the following formula to calculate a similarity between the target user a and other users u:

$$Sim(a, u) = \frac{\sum_{a \in S(\cap)} \lambda_a(\overline{Val(a, s)} - Ave(\overline{Val(a)})) * \lambda_u(\overline{Val(u, s)} - Ave(\overline{Val(u)}))}{\sqrt{\sum_{a \in S(\cap)} \lambda_a(\overline{Val(a, s)} - Ave(\overline{Val(a)}))^2} * \sqrt{\sum_{a \in S(\cap)} \lambda_u(\overline{Val(u, s)} - Ave(\overline{Val(u)}))^2}}$$

wherein: S(a) and S(u) denote the service invoked by the target user a and other users u respectively, $S(\cap)=S(a)\cap S(u)$ denotes the service invoked by both the target user a and other users u; $\overline{Val(a,s)}$ denotes compressed service quality information generated from the target user a invoking the service s; and $Ave(\overline{Val(a)})$ denotes a data average of service quality generated from the target user a invoking all services.

In order to avoid overestimation during the calculation of similarity, preferably, the introduction of a weighting factor in a similarity calculation process reduces the overestimation of user similarity, as shown in the following formula:

$$Sim'(a, u) = \frac{2 * |S(a) \cap S(u)|}{|S(a) \cup S(u)|} * Sim(a, u).$$

The more service quality data generated by the user, the higher the accuracy of the set of similar user neighbors calculated.

Further, a set of users' similar neighbors of the target user is obtained through Top–k algorithm.

The step (3) comprises:
(1) defining a paradigm of user relationship:

$$\min \sum_{i=1}^{m} \left\| U_i - \sum_{u \in T(i)} EU_{iu} * U_u \right\|_F^2,$$

$$EU_{iu} = \frac{Sim'(i, u)}{\sum_{g \in T(i)} Sim'(i, g)};$$

wherein: T(i) denotes a service set in the set of similar neighbors of user i, Sim'(i,u) denotes a user similarity between the user i and a user u; U(i) denotes a feature vector of the user i; and the paradigm is to minimize behavioral difference between the user i and a user of the set of similar neighbors as much as possible;
(2) combining the paradigm of user relationship with a matrix factorization formula to construct an objective function:

$$\mathcal{L}_U(R, U, S) = \frac{1}{2} \sum_{i=1}^{m} \sum_{j=1}^{n} I_{ij} (R_{ij} - U_i^T S_j)^2 +$$

$$\frac{\lambda_1}{2} \|U\|_F^2 + \frac{\lambda_2}{2} \|S\|_F^2 + \frac{\alpha_1}{2} \sum_{i=1}^{m} \left\| U_i - \sum_{u \in T(i)} EU_{iu} * U_u \right\|_F^2,$$

wherein: $R=U^TS$ denotes a user-service matrix; $I_{i,j}$ denotes an indicator function, and if the user i has invoked a service j, the value of $I_{i,j}$ is 1, otherwise, 0; $\|\bullet\|^2$ denotes a Fibonacci constant, which is used to prevent overfitting of the function; $\lambda_1$ and $\lambda_2$ are learning parameters; and $\alpha_1$, as a parameter, controls the importance of the paradigm of user relationship; and
(3) using a gradient descent algorithm to obtain an optimal solution of the objective function, and performing matrix factorization based on the optimal solution, wherein a value in an obtained submatrix is a predicted value of the service quality The service quality prediction method of the present invention can provide a basis for decision-making, perform targeted service optimization based on the service quality information, and provide more accurate service recommendation.

Compared with the prior art, the present invention includes the following beneficial effects:
(1) through the construction of service uncertainty quality model, the uncertainty service quality scenarios generated by users' multiple invokes to services in a dynamic application environment is described in detail;

(2) by mining similar neighbors of the user, the accuracy of QoS prediction is improved by collaborative filtering; and
(3) through the prediction of service quality, the decision-making basis can be provided when the user making service choices, targeted service optimization based on service quality information can be performed, and more accurate service recommendations can be provided.

DETAILED DESCRIPTION OF THE EMBODIMENTS

The present invention is further described in detail below in combination with the drawings and embodiments. It should be pointed out that the embodiments described below are intended to facilitate the understanding of the present invention without any limitation.

Figure 1:
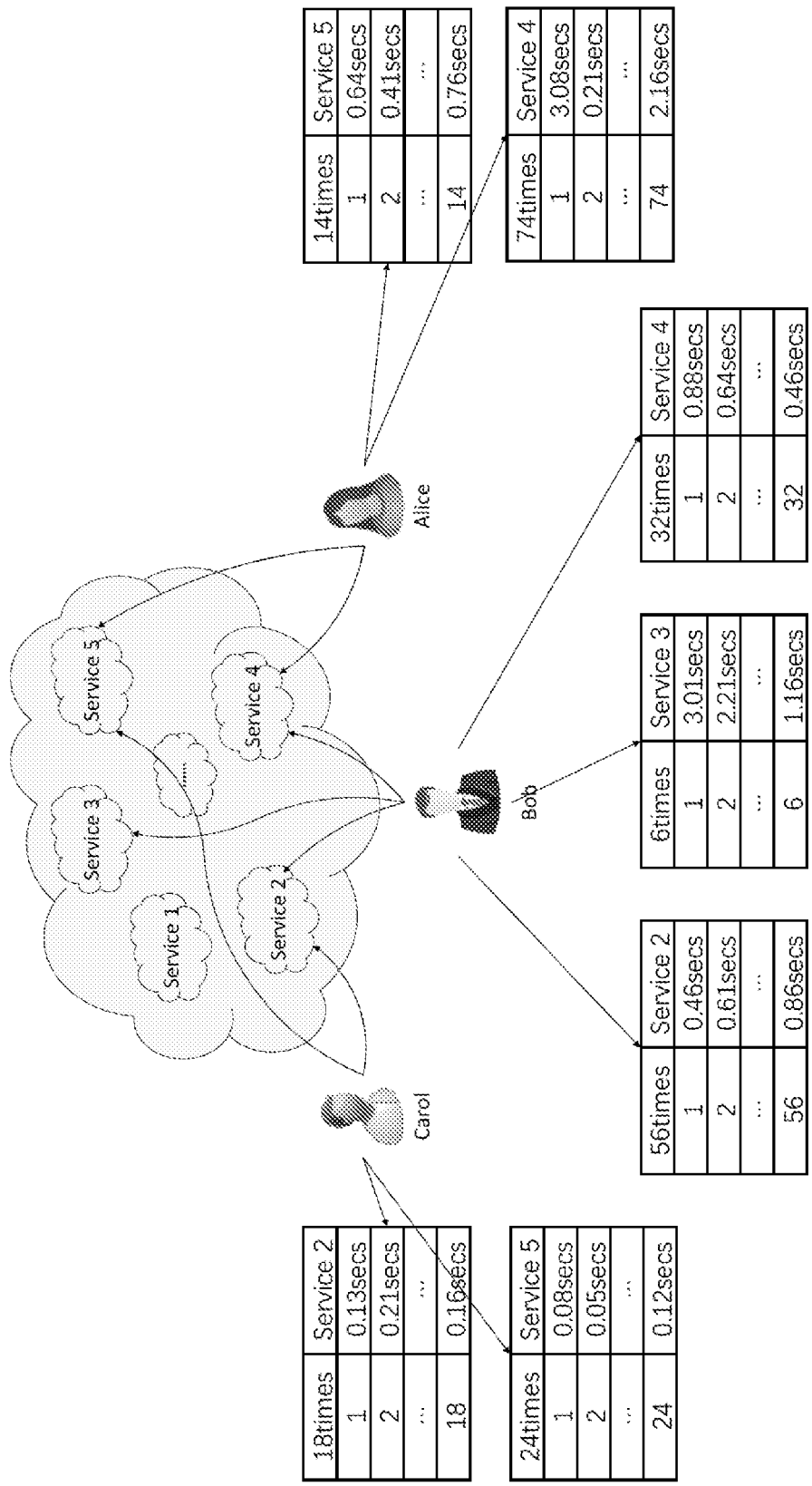
FIG. 1 shows an uncertainty status of service quality.

FIG. 1 shows a schematic diagram of an uncertainty status of service quality when a user invokes a service. It can be seen from FIG. 1 that a group of users invoke different services at different times and places, resulting in service quality logs with uncertain characteristics.

A numerical change of service quality of "service response time" caused by multiple invokes to the same service reflects the uncertainty of dynamic application environment. Based on the above information, the "service response time" that may occur when the invoker invokes Service 5 needs to be predicted.

Figure 2:
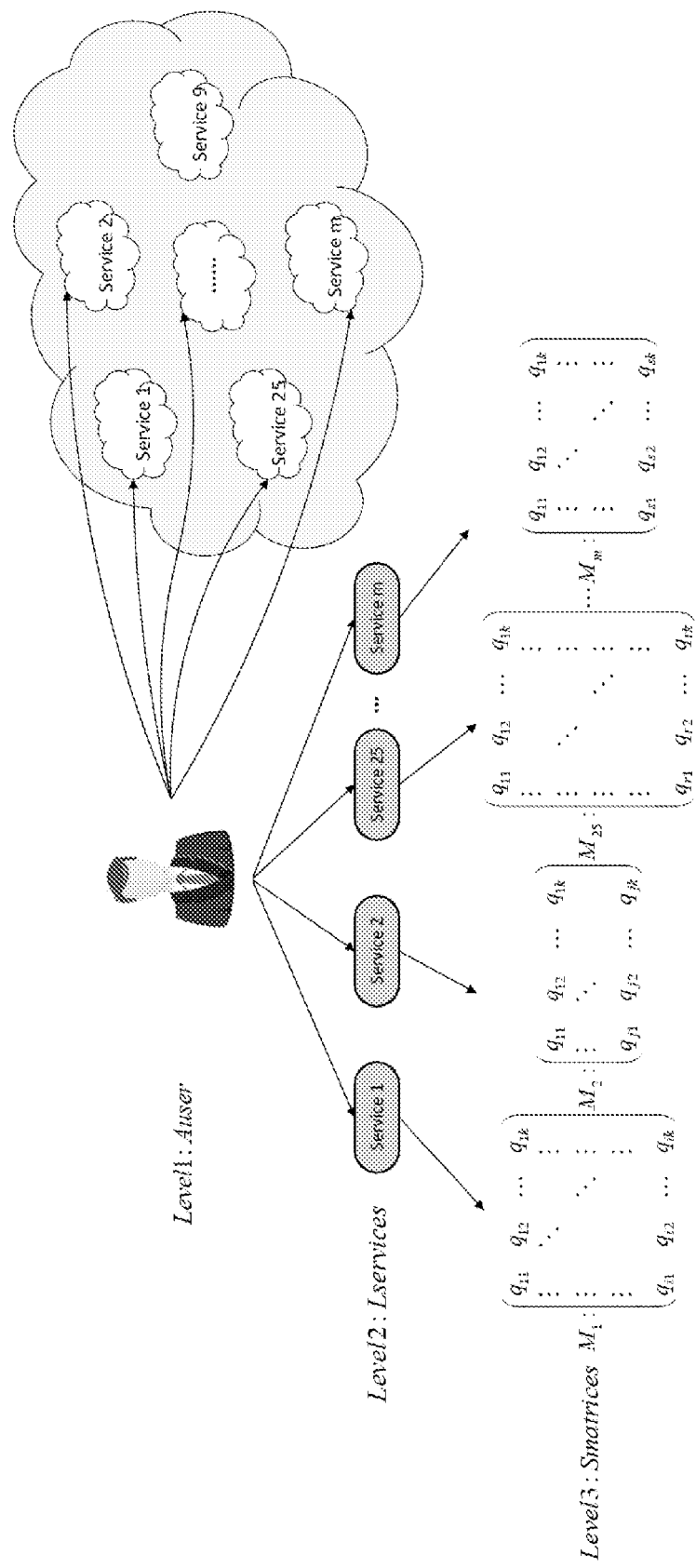
FIG. 2 shows a service uncertainty quality model.

FIG. 2 shows a schematic diagram of a constructed service uncertainty quality model. The construction process of the service uncertainty quality model is as follows:

(1) constructing the service uncertainty quality model of the user as a quaternion >Auser, Lservices, Smatrices, f>; wherein Auser denotes an active user; Lservices denotes a list of all services invoked by a current active user; Smatrices denotes an uncertainty quality matrix group, wherein each matrix records service quality log information generated from a service in the Lservices invoked by Auser; and f denotes a mapping relation between a service and a corresponding uncertainty quality matrix; and
(2) thus visualizing the service uncertainty quality model of the user as a three-level tree structure, which comprises a user layer, a service layer, and a service quality matrix layer.

In order to integrate external heuristic information of uncertainty into the matrix factorization framework, it is necessary to identify a neighbor set of a similar user for QoS prediction.

The mining process of similar user neighbor is as follows.

Given a user, its similar neighbor set can be obtained by calculating a similarity between a current user and other users according to the service uncertainty quality model. Given an uncertain service quality matrix, the matrix can be transformed into a vector by calculating an average value of each quality data. To simplify the calculation, only the $i^{th}$ QoS information is considered. The average value of the quality data is calculated as follows:

$$\overline{Val(a, s)} = \frac{\sum_{j=1}^{n} V(q_{ji})}{n}$$

wherein: n denotes the number of invoking of a user a to a service s; $V(q_{ji})$ denotes information of $j^{th}$ service quality when the user a invokes the service s for the $i^{th}$ time.

After transformation, an improved PCC algorithm may be used to calculate the similarity between a user a and a user u. Firstly, a weighting factor for the user a and the user u is calculated:

$$\lambda_a = \frac{N_a(s)}{N_a(s) + N_u(s)},$$

$$\lambda_u = \frac{N_u(s)}{N_a(s) + N_u(s)};$$

wherein: $N_a(s)$ denotes the number of invoking of the user a to the service s; and $N_u(s)$ denotes the number of invoking of the user u to the service s.

$$Sim(a, u) = \frac{\sum_{s \in S(\cap)} \lambda_a(\overline{Val(a, s)} - Ave\overline{(Val(a))}) * \lambda_u(\overline{Val(u, s)} - \overline{Ave(Val(u))})}{\sqrt{\sum_{s \in S(\cap)} (\lambda_a(\overline{Val(a, s)} - Ave\overline{Val(a)}))^2 * \sum_{s \in S(\cap)} (\lambda_u(\overline{Val(u, s)} - Ave\overline{(Val(u))}))^2}}$$

wherein: S(a) and S(u) denote the service invoked by the user a and the user u S(∩)=S(a)∩S(u) denotes the service invoked by both the user a and the user u; $\overline{Val(a,s)}$ denotes compressed service quality information generated from the target user a invoking the service s; and $Ave(\overline{Val(a)})$ denotes a data average of service quality generated from the user invoking all services.

The above steps calculate the similarity of service quality generated by the user invoking different services, however, the similarity calculation process may be overestimated. For example, two users have invoked a small number of services, but the service quality generated by these invokes is very similar. Based on the above observations, the present invention proposes a weighting factor to reduce the overestimation of user similarity, as shown in the following formula:

$$Sim'(a, u) = \frac{2 * |S(a) \cap S(u)|}{|S(a) \cup S(u)|} * Sim(a, u).$$

Based on the above formula, the more service quality data generated by the user, the higher the accuracy of the set of similar user neighbors calculated.

Based on the above steps, the set of users' similar neighbors can be obtained through Top–k algorithm:

$$T(a)=\{u|u \in U'u \in Top-K(a), u \neq a\},$$

wherein T(a) denotes a set of a collection of K services that are most similar to the user a.

In a collaborative filtering based service recommendation system, the invocation behavior of users in the same set of similar user neighbors should be highly similar. Based on such assumption, the present invention comprehensively considers the service quality information in similar neighbors of the target user, and proposes an improved matrix factorization algorithm User_Uncertain Matrix Factorization. The calculation method of the algorithm is described as follows.

User relationship standardization terms are defined:

$$\min \sum_{i=1}^{m} \left\| U_i - \sum_{u \in T(i)} EU_{iu} * U_u \right\|_F^2,$$

$$EU_{iu} = \frac{Sim'(i, u)}{\sum_{g \in T(i)} Sim'(i, g)};$$

wherein: T(i) denotes a service set in the set of similar neighbors of user i, Sim'(i,u) denotes a user similarity between the user i and a user u; U(i) denotes a feature vector of the user i; and the paradigm is to minimize behavioral difference between the user i and a user of the set of similar neighbors as much as possible. On such basis, this paradigm is combined with the conventional matrix factorization formula to form a new objective function for uncertainty service quality prediction:

$$\mathcal{L}_U(R, U, S) = \frac{1}{2} \sum_{i=1}^{m} \sum_{j=1}^{n} I_{ij} (R_{ij} - U_i^T S_j)^2 +$$

$$\frac{\lambda_1}{2} \|U\|_F^2 + \frac{\lambda_2}{2} \|S\|_F^2 + \frac{\alpha_1}{2} \sum_{i=1}^{m} \left\| U_i - \sum_{u \in T(i)} EU_{iu} * U_u \right\|_F^2,$$

wherein: R=U T S denotes a user-service matrix; $I_{i,j}$ denotes an indicator function, and if the user i has invoked a service j, the value of $I_{i,j}$ is 1, otherwise, 0; $\|\bullet\|_F^2$ denotes a Fibonacci constant, which is used to prevent overfitting of the function; $\lambda_1$ and $\lambda_2$ are learning parameters; and $\alpha_1$, as a parameter, controls the importance of the paradigm of user relationship.

Finally, in order to solve the service quality prediction problem based on service uncertainty, the present invention uses the most commonly used gradient descent algorithm to obtain an optimal solution of the objective function, and the value in the submatrix obtained by matrix factorization based on the optimal solution is a predicted value of the service quality:

$$\frac{\partial \mathcal{L}_U}{\partial U_i} = \sum_{j=1}^{n} I_{i,j} (R_{i,j} - U_i^T S_j)(-S_j) + \lambda_1 U_i + \alpha_1 \left( U_i - \sum_{u \in T(i)} EU_{in} * U_u \right) \frac{\partial \mathcal{L}_U}{\partial S_j} =$$

$$\sum_{i=1}^{m} I_{i,j} (R_{i,j} - U_i^T S_j)(-U_i) + \lambda_2 S_j.$$

The above embodiments have described the technical solution and beneficial effects of the present invention in detail. It should be understood that the above embodiments are only specific embodiments of the present invention and are not used to limit the present invention. Any modification, supplement and equivalent replacement made within the principal scope of the present invention should be included in the protection scope of the present invention.

The invention claimed is:
1. A service quality prediction method in a service network environment, comprising the steps of:

(1) constructing a service uncertainty quality model of a user through service quality log information generated when the user invokes the same or different services for multiple times;
(2) tapping a set of similar users of a target user based on the service uncertainty quality model of the user; and
(3) improving a matrix factorization algorithm based on similarity information of the set of similar users of the target user to achieve accurate prediction of service quality, wherein the step (1) comprises:
(1-1) defining the service uncertainty quality model of the user as a quaternion <Auser, Lservices, Smatrices, f>;
wherein:
Auser denotes an active user;
Lservices denotes a list of all services invoked by a current active user;
Smatrices denotes an uncertainty quality matrix group, wherein each matrix records service quality log information generated from a service in the Lservices invoked by Auser; and
f denotes a mapping relation between a service and a corresponding uncertainty quality matrix;
(1-2) visualizing the service uncertainty quality model of the user as a three-level tree structure, wherein the three-level tree structure comprises:
a user layer, denoting a current service invoker;
a service layer, denoting all services invoked by the current service invoker; and
a mapping matrix layer, denoting a service quality matrix generated when the current service invoker invokes a service for multiple times.

2. The service quality prediction method in a service network environment according to claim 1, wherein the step (2) comprises:
(2-1) calculating an average service quality value for each column in a quality matrix in the service uncertainty quality model, and transforming the quality matrix into a quality vector; and
(2-2) using a PCC algorithm to calculate a similarity between the target user and other users according to the quality vector, and selecting the set of similar users of the target user according to a given similarity threshold.

3. The service quality prediction method in a service network environment according to claim 2, wherein in the step (2-1), the calculation formula of the average service quality value is:

$$Val(a, s) = \frac{\sum_{j=1}^{n} V(q_{ji})}{n}$$

wherein: n denotes the number of invoking of a user a to a service s; V ($q_{ji}$) denotes information of $j^{th}$ service quality when the user a invokes the service s for the $i^{th}$ time.

4. The service quality prediction method in a service network environment according to claim 2, wherein in the step (2-2), using a PCC algorithm to calculate a similarity between the target user and other users comprises:
(i) calculating weighting factors for a target user a and other users u;

$$\lambda_a = \frac{N_a(s)}{N_a(s) + N_u(s)},$$

$$\lambda_u = \frac{N_u(s)}{N_a(s) + N_u(s)};$$

wherein: $N_a(s)$ denotes the number of invoking of the target user a to the service s; and $N_u(s)$ denotes the number of invoking of other users u to the service s; and (ii) using the following formula to calculate a similarity between the target user a and other users u:

$$Sim(a, u) = \frac{\sum_{s \in S(\cap)} \lambda_a(\overline{Val(a, s)} - Ave(\overline{Val(a)})) * \lambda_u(\overline{Val(u, s)} - \overline{Ave(Val(u))})}{\sum_{s \in S(\cap)} (\lambda_a\overline{Val(a, s)} - Ave\overline{Val(a)}))^2 * \sqrt{\sum_{s \in S(\cap)} (\lambda_u(\overline{Val(u, s)} - Ave(\overline{Val(u)})))^2}}$$

wherein: denote the service invoked by the target user a and other users u respectively, $S(\cap)=S(a)\cap S(u)$ denotes the service invoked by both the target user a and other users u; $\overline{Val(a,s)}$ denotes compressed service quality information generated from the target user a invoking the service s; and $Ave(\overline{Val(a)})$ denotes a data average of service quality generated from the target user a invoking all services.

5. The service quality prediction method in a service network environment according to claim 4, wherein the introduction of a weighting factor in a similarity calculation process reduces the overestimation of user similarity, as shown in the following formula:

$$Sim'(a, u) = \frac{2 * |S(a) \cap S(u)|}{|S(a) \cup S(u)|} * Sim(a, u).$$

6. The service quality prediction method in a service network environment according to claim 2, wherein in the step (2-2), according to the similarity between users, a set of users' similar neighbors of the target user is obtained through Top-k algorithm.

7. The service quality prediction method in a service network environment according to claim 1, wherein the step (3) comprises:

(1) defining a paradigm of user relationship:

$$\min \sum_{i=1}^{m} \left\| U_i - \sum_{u \in T(i)} EU_{iu} * U_u \right\|_F^2,$$

$$EU_{iu} = \frac{Sim'(i, u)}{\sum_{g \in T(i)} Sim'(i, g)};$$

wherein: T (i) denotes a service set in the set of similar neighbors of user i, Sim'(i,u) denotes a user similarity between the user i and a user u; U(i) denotes a feature vector of the user i; and the paradigm is to minimize behavioral difference between the user i and a user of the set of similar neighbors as much as possible;

(2) combining the paradigm of user relationship with a matrix factorization formula to construct an objective function:

$$\mathcal{L}_U(R, U, S) = \frac{1}{2}\sum_{i=1}^{m}\sum_{j=1}^{n} I_{ij}(R_{ij} - U_i^T S_j)^2 +$$

$$\frac{\lambda_1}{2}\|U\|_F^2 + \frac{\lambda_2}{2}\|S\|_F^2 + \frac{\alpha_1}{2}\sum_{i=1}^{m}\left\|U_i - \sum_{u \in T(i)} EU_{iu} * U_u\right\|_F^2,$$

wherein: $R=U^TS$ denotes a user-service matrix; $I_{i,j}$ denotes an indicator function, and if the user i has invoked a service j, the value of $I_{i,j}$ is 1, otherwise, 0; $\|\bullet\|_F^2$ denotes a Fibonacci constant, which is used to prevent overfitting of the function; $\lambda_1$ and $\lambda_2$ are learning parameters; and $\alpha_1$, as a parameter, controls the importance of the paradigm of user relationship; and (3) using a gradient descent algorithm to obtain an optimal solution of the objective function, and performing matrix factorization based on the optimal solution, wherein a value in an obtained submatrix is a predicted value of the service quality.

* * * * *